United States Patent
Reznik et al.

(10) Patent No.: US 8,068,511 B2
(45) Date of Patent: Nov. 29, 2011

(54) METHOD AND APPARATUS FOR SENDING FEEDBACK FOR A DOWNLINK SHARED SERVICE AND ESTIMATING A NUMBER OF WIRELESS TRANSMIT/RECEIVE UNITS

(75) Inventors: Alexander Reznik, Titusville, NJ (US); Eldad M. Zeira, Huntington, NY (US); Christopher R. Cave, Verdun (CA); Paul Mariner, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 89 days.

(21) Appl. No.: 12/549,726

(22) Filed: Aug. 28, 2009

(65) Prior Publication Data
US 2010/0014434 A1    Jan. 21, 2010

Related U.S. Application Data

(63) Continuation-in-part of application No. 11/869,923, filed on Oct. 10, 2007.

(60) Provisional application No. 60/828,881, filed on Oct. 10, 2006, provisional application No. 60/883,594, filed on Jan. 5, 2007, provisional application No. 61/093,142, filed on Aug. 29, 2008.

(51) Int. Cl.
*H04L 12/413* (2006.01)
*H04L 12/43* (2006.01)
(52) U.S. Cl. .................... 370/447; 370/462
(58) Field of Classification Search ............ 370/332, 370/338, 447, 462
See application file for complete search history.

(56) References Cited

U.S. PATENT DOCUMENTS

| | | |
|---|---|---|
| 2003/0005382 A1 | 1/2003 | Chen et al. |
| 2003/0210668 A1 | 11/2003 | Malladi et al. |
| 2004/0152458 A1 | 8/2004 | Hottinen |
| 2006/0176966 A1 | 8/2006 | Stewart et al. |

(Continued)

FOREIGN PATENT DOCUMENTS

EP    1641302    3/2006

(Continued)

OTHER PUBLICATIONS

Digital Video Broadcasting, "Hierarchical Modulation Explained", A Brief Introduction, DVB-T Hierarchical Modulation, (Mar. 2000).

(Continued)

*Primary Examiner* — Andrew Lee
(74) *Attorney, Agent, or Firm* — Volpe and Koenig, P.C.

(57) ABSTRACT

A method and an apparatus for sending a signal on a contentious feedback channel for a downlink shared service and for estimating a number of wireless transmit/receive units (WTRUs) are disclosed. When a transmission criterion associated with a physical random access feedback channel (P-RAFCH) is satisfied, a physical resource is randomly selected among a plurality of physical resources assigned for the P-RAFCH and a pre-configured signal is sent using the selected physical resource. A Node-B receives the pre-configured signal from a plurality of WTRUs and calculates a number of the WTRUs based on a number of used physical resources. The transmission criterion is at least one of successful reception of a data packet on a downlink physical channel, successful reception of a data block on a data service, reception of a signaling command, occurrence of a measurement event, and failure to receive a transmission after a specified number of times.

20 Claims, 5 Drawing Sheets

U.S. PATENT DOCUMENTS

| | | | |
|---|---|---|---|
| 2008/0084844 A1 | 4/2008 | Reznik et al. | |
| 2008/0170541 A1 | 7/2008 | Vartiainen et al. | |
| 2008/0261582 A1 | 10/2008 | Sarkar et al. | |
| 2009/0023467 A1 | 1/2009 | Huang et al. | |
| 2009/0268676 A1 | 10/2009 | Wigard et al. | |
| 2010/0014434 A1 | 1/2010 | Reznik et al. | |
| 2010/0189025 A1 | 7/2010 | Cheng | |
| 2010/0220693 A1 | 9/2010 | Ho | |
| 2010/0226263 A1* | 9/2010 | Chun et al. | 370/252 |
| 2010/0290407 A1 | 11/2010 | Uemura | |
| 2010/0329182 A1* | 12/2010 | Wigard et al. | 370/328 |

FOREIGN PATENT DOCUMENTS

| | | |
|---|---|---|
| EP | 1718097 | 11/2006 |
| WO | 2004/042963 | 5/2004 |
| WO | 2005/018144 | 2/2005 |
| WO | 2006/083140 | 8/2006 |
| WO | 2006/088301 | 8/2006 |
| WO | 2006/105010 | 10/2006 |

OTHER PUBLICATIONS

Gesbert et al., "How Much Feedback is Multi-User Diversity Really Worth?" IEEE International Conference on Communications, vol. 1, pp. 234-238, XP010709995 (Jun. 20, 2004).

LG Electronics, "Enhancements of CELL-FACH State", 3GPP TSG-RAN WG2 #54, R2-062440, (Tallinn, Estonia Aug. 28-Sep. 1, 2006).

LG Electronics, "MBMS on HSDPA", 3GPP TSG RAN WG2 Meeting #51, R2-060583, (Denver Feb. 13-17, 2006).

Third Generation Partnership Project, "Technical Specification Group Radio Access Network; Physical Channels and Mapping of Transport Channels Onto Physical Channels (FDD) (Release 6)", 3GPP TS 25.211 V6.7.0 (Dec. 2005).

Third Generation Partnership Project, "Technical Specification Group Radio Access Network; Physical Channels and Mapping of Transport Channels Onto Physical Channels (FDD) (Release 6)", 3GPP TS 25.211 V6.8.0 (Sep. 2007).

Third Generation Partnership Project, "Technical Specification Group Radio Access Network; Physical Channels and Mapping of Transport Channels Onto Physical Channels (FDD) (Release 7)", 3GPP TS 25.211 V7.0.0 (Mar. 2006).

Third Generation Partnership Project, "Technical Specification Group Radio Access Network; Physical Channels and Mapping of Transport Channels Onto Physical Channels (FDD) (Release 7)", 3GPP TS 25.211 V7.3.0 (Sep. 2007).

Third Generation Partnership Project, "Technical Specification Group Radio Access Network; Physical Layer Procedures (FDD) (Release 6)", 3GPP TS 25.214 V6.8.0 (Mar. 2006).

Third Generation Partnership Project, "Technical Specification Group Radio Access Network; Physical Layer Procedures (FDD) (Release 6)", 3GPP TS 25.214 V6.9.0 (Jun. 2006).

Third Generation Partnership Project, "Technical Specification Group Radio Access Network; Physical Layer Procedures (FDD) (Release 6)", 3GPP TS 25.214 V6.11.0 (Dec. 2006).

Third Generation Partnership Project, "Technical Specification Group Radio Access Network; Physical Layer Procedures (FDD) (Release 7)", 3GPP TS 25.214 V7.1.0 (Jun. 2006).

Third Generation Partnership Project, "Technical Specification Group Radio Access Network; Physical Layer Procedures (FDD) (Release 7)", 3GPP TS 25.214 V7.6.0 (Sep. 2007).

Third Generation Partnership Project, "Technical Specification Group Radio Access Network; Medium Access Control (MAC) Protocol Specification (Release 6)", 3GPP TS 25.321 V6.4.0 (Mar. 2005).

Third Generation Partnership Project, "Technical Specification Group Radio Access Network; Medium Access Control (MAC) Protocol Specification (Release 6)", 3GPP TS 25.321 V6.9.0 (Jun. 2006).

Third Generation Partnership Project, "Technical Specification Group Radio Access Network; Medium Access Control (MAC) Protocol Specification (Release 6)", 3GPP TS 25.321 V6.13.0 (Jun. 2007).

Third Generation Partnership Project, "Technical Specification Group Radio Access Network; Medium Access Control (MAC) Protocol Specification (Release 7)", 3GPP TS 25.321 V7.1.0 (Jun. 2006).

Third Generation Partnership Project, "Technical Specification Group Radio Access Network; Medium Access Control (MAC) Protocol Specification (Release 7)", 3GPP TS 25.321 V7.5.0 (Jun. 2007).

TSGR2, "Enhanced CELL-FACH State in FDD", RP-060606, (Sep. 2006).

Third Generation Partnership Project, "Technical Specification Group Radio Access Network; Medium Access Control (MAC) Protocol Specification (Release 7)", 3GPP TS 25.321 V7.1.0 (Jun. 2006).

Third Generation Partnership Project, "Technical Specification Group Radio Access Network; Medium Access Control (MAC) Protocol Specification (Release 7)", 3GPP TS 25.321 V7.5.0 (Jun. 2007).

TSGR2, "Enhanced CELL-FACH State in FDD", RP-060606, (Sep. 2006).

* cited by examiner

METHOD AND APPARATUS FOR SENDING FEEDBACK FOR A DOWNLINK SHARED SERVICE AND ESTIMATING A NUMBER OF WIRELESS TRANSMIT/RECEIVE UNITS

CROSS REFERENCE TO RELATED APPLICATION

This application is a continuation-in-part of U.S. patent application Ser. No. 11/869,923 filed Oct. 10, 2007, which claims the benefit of U.S. provisional application Ser. Nos. 60/828,881 filed Oct. 10, 2006 and 60/883,594 filed Jan. 5, 2007, which are incorporated by reference as if fully set forth. This application also claims the benefit of U.S. provisional application Ser. No. 61/093,142 filed Aug. 29, 2008, which is incorporated by reference as if fully set forth.

FIELD OF INVENTION

The present invention is related to wireless communications.

BACKGROUND

Introduction of downlink shared services, (i.e., broadcast or multicast transmissions), over a high speed physical downlink shared channel (HS-PDSCH) has been discussed in several contexts including enhanced multimedia broadcast multicast services (MBMS) and transmissions to wireless transmit/receive units (WTRUs) in a radio resource control (RRC) CELL_FACH state. For the downlink shared services, the same data stream is intended for a plurality of WTRUs that are known or thought to be in a cell, and the network may allow the data to be viewable to other WTRUs. Guarantee of data delivery to some or most of the WTRUs is important and a mechanism to provide such a guarantee should be supported.

Using HS-PDSCH or similar channel for delivery of the downlink shared services offers several advantages. The HS-PDSCH is a shared physical channel well suited for delivery of services across a wide-range of quality of service (QoS) classes. The HS-PDSCH is also optimized for packet services as most shared services are likely to be, (e.g., forward access channel (FACH) data and MBMS data are most likely packetized). The HS-PDSCH also supports hybrid automatic repeat request (HARQ), which can be used to guarantee or significantly improve packet delivery.

In order to take advantage of the HARQ mechanism of HS-PDSCH, a feedback mechanism is required which allows the WTRUs to send a positive acknowledgement (ACK) or a negative acknowledgement (NACK) to a Node-B. In high speed downlink packet access (HSDPA), the ACK or NACK message is delivered to the Node-B via a dedicated uplink channel, (i.e., high speed dedicated physical control channel (HS-DPCCH)). This not only guarantees availability of channel resources to deliver the ACK or NACK message, it also allows the Node-B to identify which WTRU a particular ACK or NACK message originates from.

Additionally, performance of HSDPA is significantly enhanced through the availability of channel quality indicator (CQI) feedback from the WTRUs. Conventionally, the CQI is also sent via the HS-DPCCH and the Node-B may identify the source of the CQI.

While the approach above is practical when the HS-PDSCH is primarily used to carry dedicated data in a CELL_DCH state, it is no longer practical for delivery of shared data or dedicated data when the WTRUs are operating in a CELL_FACH state. Any other currently available mechanisms for delivery of ACK/NACK and CQI feedback are insufficient for operation outside of CELL_DCH state, (i.e., when dedicated resources are not available). There may be a very large number of WTRUs listening to a particular shared service in a cell. Dedicating a resource to these WTRUs and requiring ACK/NACK feedback of every single packet from these WTRUs will have a highly detrimental impact on the uplink capacity of the communication systems. Moreover, WTRUs not registered in a cell cannot have an access to the resources.

Since a dedicated resource is not allocated in a CELL_FACH state, the only currently available alternative for delivering an ACK or NACK message and a CQI is via a random access channel (RACH). Delivering an ACK or NACK message and a CQI via a RACH would likely to have a severe impact on the uplink capacity and is not practical. If the ACK or NACK messages and a CQI are delivered from all WTRUs, given that the downlink data is shared among a large number of WTRUs, conventional RACH operation may require a large number of retransmission of almost all data. Therefore, delivering feedback via a conventional RACH is impractical.

It would be desirable to provide a mechanism for feedback from WTRUs for a downlink shared service, while the impact on the uplink and downlink capacity is minimal.

SUMMARY

A method and an apparatus for sending a signal on a contentious feedback channel for a downlink shared service and for estimating a number of WTRUs are disclosed. When a transmission criterion associated with a physical random access feedback channel (P-RAFCH) is satisfied, a physical resource is randomly selected among a plurality of physical resources assigned for the P-RAFCH and a pre-configured signal is sent using the selected physical resource. A Node-B receives the pre-configured signal from a plurality of WTRUs and calculates a number of the WTRUs based on a number of used physical resources. The transmission criterion is at least one of successful reception of a data packet on a downlink physical channel, successful reception of a data block on a data service, reception of a signaling command, occurrence of a measurement event, or failure to receive a transmission after a specified number of times.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

Figure 1:
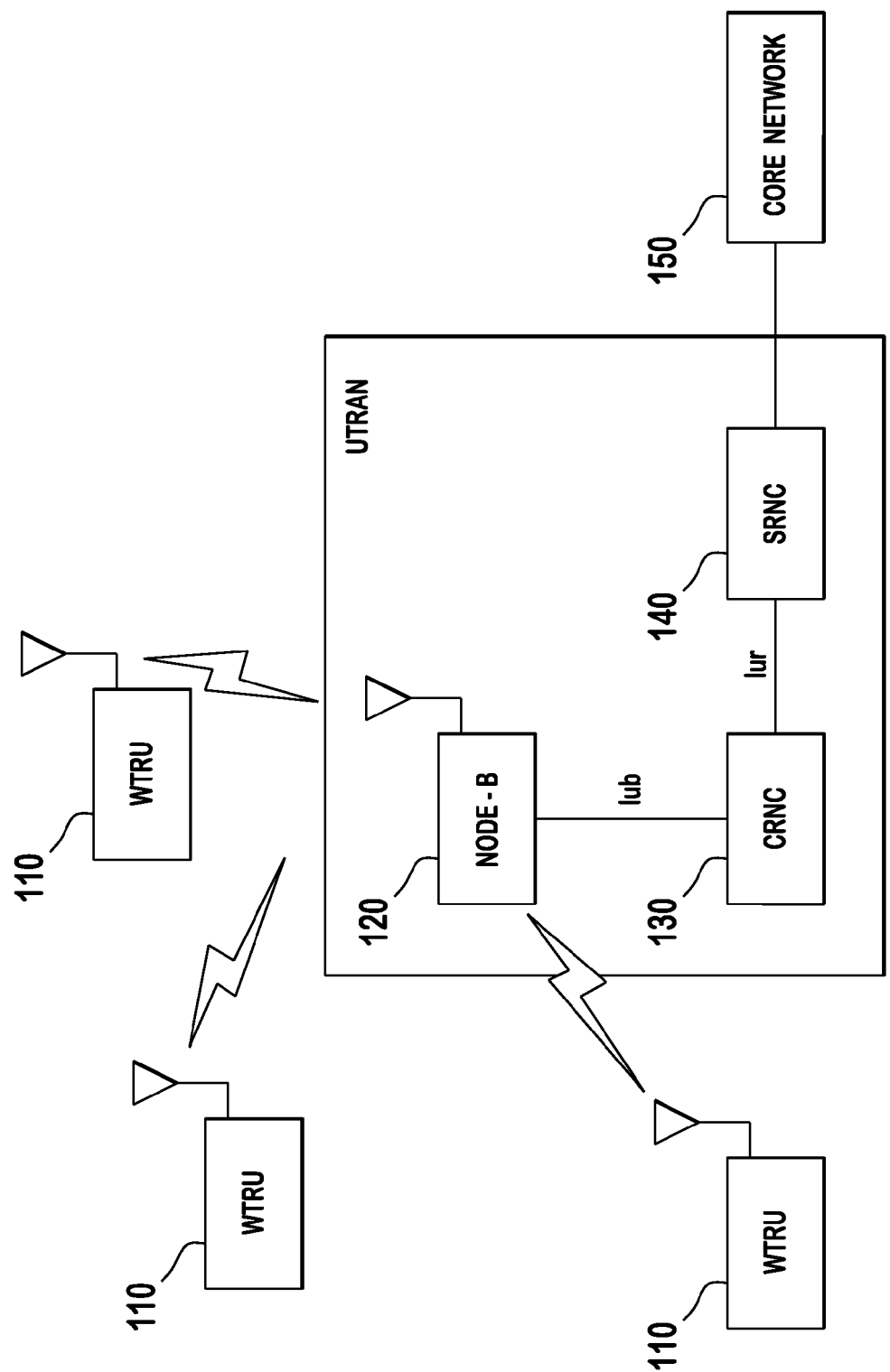
FIG. 1 is a block diagram of an example WTRU in accordance with one embodiment.

FIG. 1 shows a wireless communication system 10 including a plurality of WTRUs 100, a Node-B 120, a controlling radio network controller (CRNC) 130, a serving radio network controller (SRNC) 140, and a core network 150. The Node-B 120 and the CRNC 130 may collectively be referred to as universal terrestrial radio access network (UTRAN).

As shown in FIG. 1, the WTRUs 100 are in communication with the Node-B 120, which is in communication with the CRNC 130 and the SRNC 140. Although three WTRUs 100, one Node-B 120, one CRNC 130, and one SRNC 140 are shown in FIG. 1, it should be noted that any combination of wireless and wired devices may be included in the wireless communication system 100.

Figure 2:
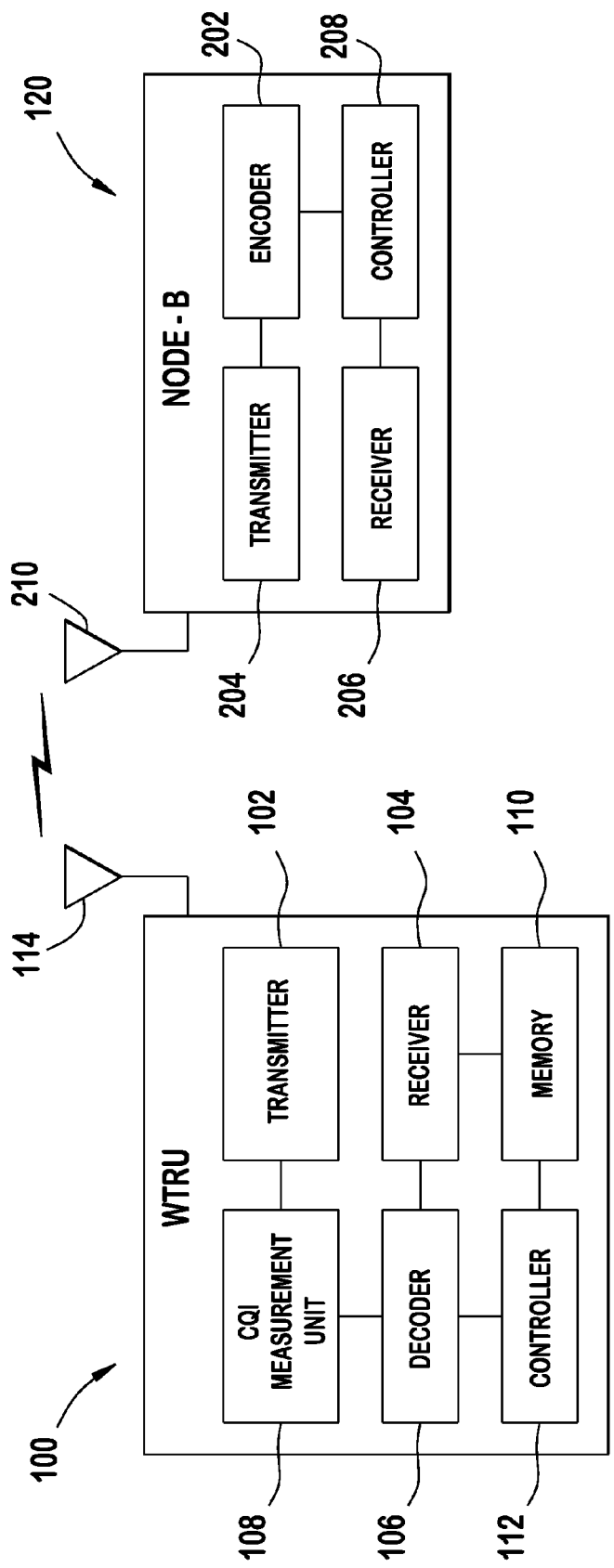
FIG. 2 is a block diagram of an example Node-B in accordance with one embodiment.

FIG. 2 is a functional block diagram of a WTRU 100 and the Node-B 120 of the wireless communication system 10 of FIG. 1. As shown in FIG. 2, the WTRU 100 is in communication with the Node-B 120 and both are configured to perform a method of sending feedback for a downlink shared serviced and estimating a number of WTRUs in a cell.

In addition to the components that may be found in a typical WTRU, the WTRU 100 includes a transmitter 102, a receiver 104, a decoder 106, a CQI measurement unit 108 (optional), a memory 110, a controller 112, and an antenna 114. The memory 110 is provided to store software including operating system, application, etc. The controller 112 is configured to perform a method of sending feedback for a downlink shared service. The receiver 104 and the transmitter 102 are in communication with the controller 112. The antenna 114 is in communication with both the transmitter 102 and the receiver 104 to facilitate the transmission and reception of wireless data.

The receiver 104 receives signals from a Node-B. The decoder 106 decodes the received signal from the Node-B. The decoder 106 may decode a high speed shared control channel (HS-SCCH) signal while the WTRU 100 is in a Cell_FACH state. The decoder 106 may decode a downlink transmission on a high speed physical downlink shared channel (HS-PDSCH) if the WTRU 100 successfully decodes an identity (ID) of the WTRU 100 on the signal on the HS-SCCH. The transmitter 102 sends feedback, (i.e., a CQI or an acknowledgement based on the decoding of the downlink transmission), to a Node-B via a contention-based shared feedback channel, which will be explained in detail below. The CQI measurement unit 108 outputs a CQI, which will be explained in detail below.

In addition to the components that may be found in a typical Node-B, the Node-B 120 includes a encoder, 202, a transmitter 204, a receiver 206, a controller 208, and an antenna 210. The controller 208 is configured to perform a method of estimating a number of WTRUs in a cell. The transmitter 202 and the receiver 204 are in communication with the controller 208. The antenna 210 is in communication with both the transmitter 202 and the receiver 204 to facilitate the transmission and reception of wireless data.

The encoder 202 encodes data stream(s) for transmission. The transmitter 204 sends a downlink transmission including the encoded data stream(s) for a downlink shared service to a plurality of WTRUs via a downlink shared channel. The controller 208 controls a downlink transmit power and/or an MCS on the downlink shared channel so that the downlink transmissions are transmitted to the WTRUs with a high likelihood of success of being received. The receiver 206 receives feedback from the WTRUs via a contention-based shared feedback channel.

Figure 3:
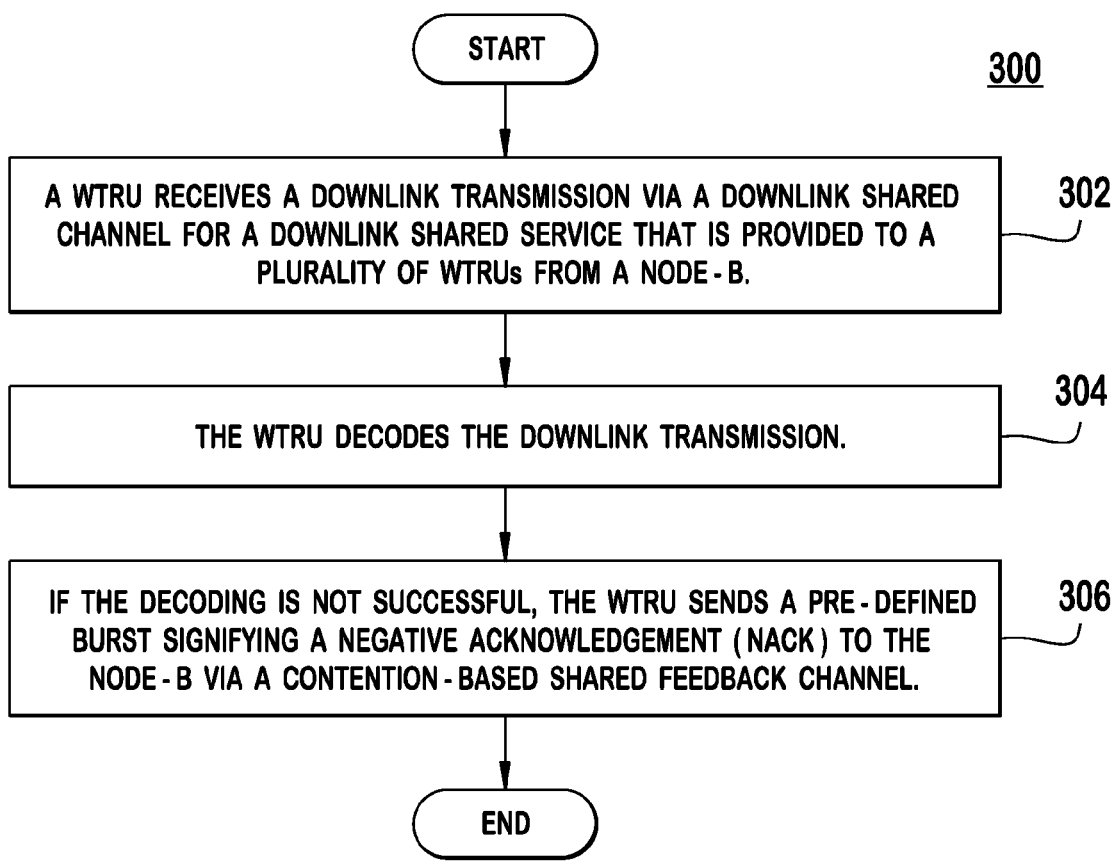
FIG. 3 is a flow diagram of a process for providing feedback for a downlink shared service via a downlink shared channel in accordance with one embodiment.

FIG. 3 is a flow diagram of a process 300 for providing feedback for a downlink shared service via a downlink shared channel in accordance with one embodiment. A WTRU 100 receives a downlink transmission via a downlink shared channel for a downlink shared service that is provided to a plurality of WTRUs from a Node-B 120 (step 302). The WTRU 100 decodes the downlink transmission (step 304). If the decoding is not successful, the WTRU 100 sends a pre-defined burst signifying a negative acknowledgement (NACK) to the Node-B 120 via a contention-based shared feedback channel (step 306). The pre-defined burst may be sent only once without requiring an acknowledgement from the Node-B 120. If the decoding is successful, the WTRU 100 does not send feedback, (i.e., an ACK is implicit).

A new uplink shared feedback channel, a physical random access feedback channel (P-RAFCH), is introduced for sending the feedback from the WTRU 100 to the Node-B 120. The P-RAFCH is a contention-based random access channel. At least one P-RAFCH may be associated with each HS-SCCH in the downlink. If several downlink shared services are supported over the HS-PDSCH(s), a set of P-RAFCHs are provided for the downlink shared services and each P-RAFCH may be dedicated to a particular downlink shared service.

The configuration of the shared feedback channel, (i.e., P-RAFCH), may be communicated via system information block (SIB) and may vary cell-by-cell. Alternatively, the shared feedback channel configuration may be signaled through dedicated RRC signaling to the WTRUs that have a connection to the radio access network (RAN), (e.g., WTRUs operating in a CELL_FACH state). The Node-B 120 broadcasts available scrambling codes and access slots for the shared feedback channel. The access slot duration may be the same as for the conventional RACH, and may be matched, (i.e., derived), to the transmission time interval (TTI) of the downlink shared services. When a WTRU 100 needs to provide feedback, the WTRU 100 randomly selects a physical resource, (e.g., a code and an access slot), associated with a particular TTI on a particular downlink shared service and sends its feedback.

It should be noted that the P-RAFCH may be defined by a combination of any physical resources including, but not limited to, code, subcarrier, time, space, etc., and the exact definition of the P-RAFCH physical resource is not essential to the embodiments disclosed herein.

In transmission of the feedback, (i.e., the pre-defined burst), no transmit power ramp-up mechanism is used in contrast to the conventional RACH. The WTRU 100 may send each feedback only once and does not require acknowledgement of its receipt from the Node-B 120. The transmit power for the feedback may be determined based on the received power measured on a reference channel, (e.g., common pilot channel (CPICH), HS-PDSCH, etc.), and a network-supplied offset. The offset value may be included in an SIB. Alternatively, the network may instruct the WTRU 100 to use an absolute power, and provides a rule when the WTRU 100 is allowed to provide feedback. For example, the WTRU 100 may be permitted to send feedback only if the received reference channel power is above a pre-defined value.

If the WTRU 100 has selected a Node-B out of several synchronized Node-Bs which transmit the same downlink transmission, the WTRU 100 transmits a NACK only to that selected Node-B. If the WTRU 100 performs soft combining of signals from a plurality of Node-Bs in an active set, the WTRU 100 sends a NACK to the strongest Node-B in the active set.

The WTRU 100 may send a NACK each time the WTRU 100 fails to decode the downlink transmission. Alternatively, the WTRU 100 may send a NACK after two or more successive downlink transmissions have failed. For example, the WTRU 100 may send a NACK only if m out of n successive transmissions have failed. The numbers m and n may be determined by the network. For the purpose of counting m out of n, original transmissions, re-transmissions, both, or relative combination of both may be counted. The ability to actually send the NACK may depend on some random number with probability set by the network. The network may indicate desired transmission of the NACK on a cell different from the one where the downlink shared service, (e.g., MBMS), is received. The cell is indicated by the network.

In one embodiment, the feedback may be anonymous. If the feedback goes through, the Node-B 120 knows that some WTRU in the cell was not able to decode the downlink transmission in a particular TTI. Alternatively, the WTRU ID may be signaled. In accordance with one embodiment, the downlink shared service may be mapped to a WTRU-specific signature code that will be transmitted as the payload of the P-RAFCH. In accordance with another embodiment, a WTRU connection ID may be signaled along with the feedback. In accordance with yet another embodiment, the access opportunities to the contention-based shared feedback channel may be mapped to the downlink shared service so that the WTRU ID may be verified based on the predefined mapping. The mapping may be transmitted by the network.

The Node-B 120 calibrates the transmit power and/or adjusts an MCS of the downlink shared channel carrying the shared downlink service so that it covers the desired coverage area, (i.e., cell or a sector of a cell), with a high likelihood. With the transmit power and/or MCS adjustment, the probability that a WTRU 100 will not receive the downlink data in a TTI can be set to a desired operating point, preferably near zero. Since a WTRU 100 sending a NACK is almost certainly at the edge of the cell or sector, the downlink power computation should be done under this assumption. Since the Node-B 120 knows the cell or sector size, the Node-B 120 may configure the downlink transmit power and/or MCS so that it does not significantly interfere with other signals. Consequently, only very few WTRUs may need to send a NACK for any single TTI. With this approach where feedback power is fixed, a rule may be set to prohibit WTRUs from sending feedback.

Since a WTRU 100 sending a NACK is almost certainly at the edge of the cell or sector, the uplink transmit power on the shared feedback channel, (e.g., P-RAFCH), may be determined under this assumption. Since the Node-B 120 knows the cell or sector size, the Node-B 120 configures the uplink transmit power such that it does not significantly interfere with other signals at the Node-B 120.

Under the above assumption, (very few NACKs expected per TTI), the Node-B 120 may allocate enough shared feedback channel resources so that the probability of collision for a NACK is kept low and the Node-B 120 is able to receive a large number of NACKs without severely impacting the uplink capacity.

If the Node-B 120 receives at least one NACK, the Node-B 120 schedules a retransmission for which the NACK is received. In this way, the HS-PDSCH operates as it conventionally does under normal HSDPA operation. Packet delivery is guaranteed to the same extent as it is guaranteed under the current HARQ, (i.e., subject to a maximum limit on re-transmissions and errors in the feedback of NACKs).

The Node-B may maintain a threshold value and retransmit the downlink transmission only if the number of NACKs from the WTRUs exceeds the threshold value. While data delivery is not guaranteed, it is guaranteed that no more than a few WTRUs are unhappy. This limits the impact on the downlink shared service throughput of a small number of WTRUs. Alternatively, the Node-B 120 may ignore the NACKs. The Node-B 120 may allocate no resources to the shared feedback channel to obtain the same result.

The Node-B 120 may pool the NACKs, (i.e., keep track of data that needs retransmission), and retransmit multiple downlink transmissions at a later time as a single packet. In this case, a sequence number and buffering may need to be extended.

The Node-B 120 may implement the following downlink power control mechanism for the HS-PDSCH. Let $P_n$ be the HS-PDSCH power reference, (i.e., power per bit), for TTI n. If a NACK is received, the Node-B 120 may set the transmit power reference for TTI (n+1) as follows:

$$P_{n+1} = P_n + f(\text{num. of NACKs}) \Delta_{NACK}; \text{ or} \qquad \text{Equation (1)}$$

$$P_{n+1} = P_{MAX}. \qquad \text{Equation (2)}$$

If the Node-B 120 receives no NACKs, the Node-B 120 may set the transmit power reference for TTI (n+1) as follows:

$$P_{n+1} = P_n - \Delta_{ACK}. \qquad \text{Equation (3)}$$

Figure 4:
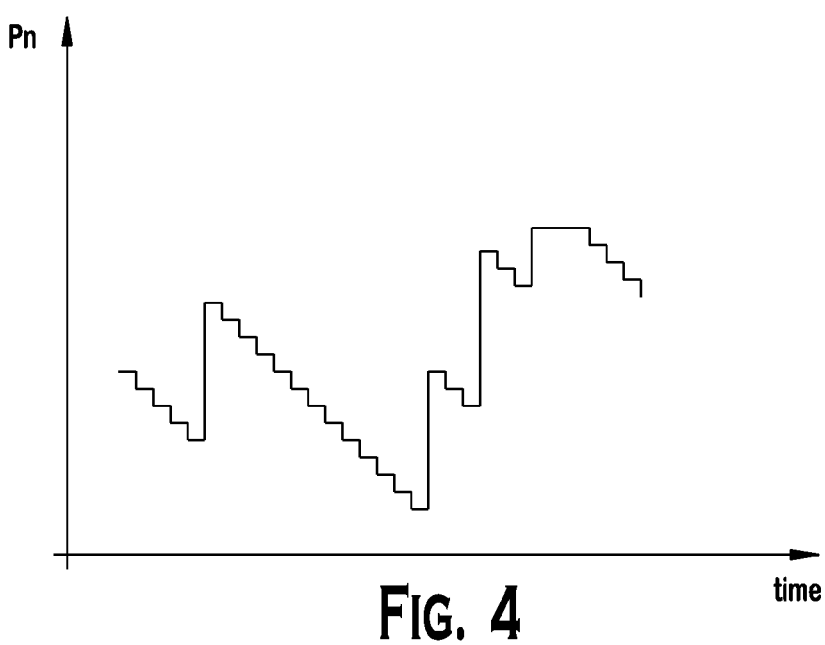
FIG. 4 shows one possible power variation scheme of an HS-PDSCH.

Here, $\Delta_{ACK}, \Delta_{NACK} > 0$, $f(\ )$ is a positive non-decreasing (but may be constant) function of its argument. If the Node-B 120 does not receive any NACKs, the Node-B 120 may bring the transmit power reference down by a pre-defined decrement. As soon as a NACK is received, the transmit power reference may be increased by a pre-defined increment. The pre-defined increment and decrement may or may not be the same. The increase may depend on the number of NACKs received (but maybe constant). The increment $f(\text{num. of NACKs})\Delta_{NACK}$ is preferably much larger than the decrement $\Delta_{ACK}$. FIG. 4 shows one possible power variation scheme of an HS-PDSCH.

The actual transmit power in TTI n depends on $P_n$ and the data format selected for the data, as it does conventionally. Additionally, a maximum and a minimum power may be set to limit the actual transmit power.

In addition to, or as an alternative to, the transmit power control, the Node-B 120 may adjust an MCS of the downlink shared service in a similar fashion. When no NACK is received, the Node-B 120 may increase the MCS order, and when at least one NACK is received, the Node-B 120 may lower the MCS order.

For both power control and MCS control, the Node-B 120 may consider the resources allocated to other services in determining the range of possible transmit power and MCS. For instance, if the load created by other services is low, the Node-B 120 may increase its transmission power and/or reduce the MCS utilized for the downlink shared services, which allows more WTRUs to decode the service.

When the Node-B 120 needs to know how many WTRUs are listening to the downlink shared service, the Node-B 120 may temporarily, (e.g., one (1) TTI), request all WTRUs to send NACKs. For this, the Node-B 120 may send a special burst or a data sequence with intentionally erroneous CRC check. This will force all WTRUs to respond with a NACK. The Node-B 120 counts the number of received NACKs, making allowances for losses due to fading and collisions. Not only does this provide a count that should be approximately correct, but if the NACK power is "absolute", (as opposed to relative to a received power), a distribution of uplink channel qualities is also obtained.

Figure 5:
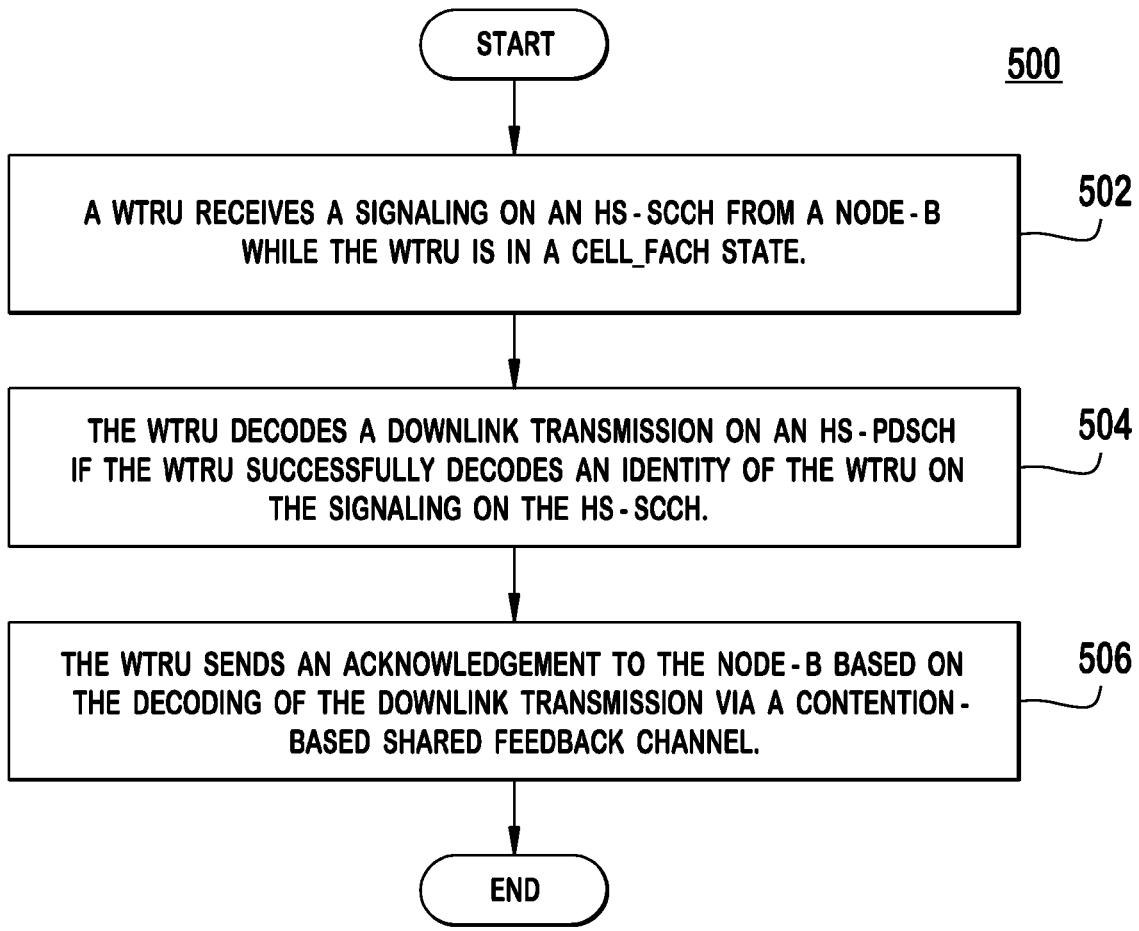
FIG. 5 is a flow diagram of a process for providing feedback for a downlink shared service transmitted to a plurality of WTRUs via HSDPA in accordance with another embodiment.

FIG. 5 is a flow diagram of an example process 500 for providing feedback for downlink shared services to WTRUs via HSDPA in accordance with another embodiment. A WTRU 100 receives signaling on an HS-SCCH from a Node-B 120 while the WTRU is in a Cell_FACH state (step 502). The WTRU 100 decodes a downlink transmission on an HS-PDSCH if the WTRU 100 successfully decodes an identity of the WTRU 100 on the signaling on the HS-SCCH (step 504). The WTRU 100 sends an acknowledgement to the Node-B 120 based on the decoding of the downlink transmission via a contention-based shared feedback channel (step 506). The transmission on the shared feedback channel and the signaling on the HS-SCCH have a fixed timing relationship.

One shared feedback channel may comprise one scrambling code and one channelization code, (or alternatively any combination of physical resources), in the uplink. At least one shared feedback channel is associated with each HS-SCCH in the downlink. The shared feedback channel is shared amongst all WTRUs in a CELL_FACH that are requested to monitor the associated HS-SCCH.

Transmission over the shared feedback channel by different WTRUs may be time multiplexed, and follow a timing restriction with respect to the signaling over the HS-SCCH. More specifically, a WTRU 100 transmits an ACK or NACK message over the associated shared feedback channel at a fixed time interval after having successfully decoded its WTRU ID, (i.e., high speed radio network temporary identity (H-RNTI)) over the HS-SCCH. The duration of the time interval should be set such that it is long enough for the WTRU 100 to receive and decode the data on the HS-PDSCH and evaluate whether there was an error, (i.e., cyclic redundancy check (CRC) verification), yet short enough to allow the Node-B 120 to quickly retransmit an erroneous transport block as part of the HARQ processing. The transmission over the shared feedback channel must last at most one (1) TTI length to avoid collisions between WTRUs transmitting feedback. Moreover, an adequate guard period should be defined to avoid WTRUs with different timing offsets, (e.g., near-far problem), from colliding when transmitting over the shared feedback channel.

The information and parameters related to the shared feedback channel may be signaled to the WTRU 100 at the same time as HS-SCCH-related information is signaled, either through an SIB over the broadcast control channel (BCCH)/broadcast channel (BCH) or through dedicated RRC signaling, (e.g., new information element (IE) in the RRC CONNECTION SETUP message).

The transmission power at which a WTRU 100 sends the feedback may be set based on the received power measured on a reference channel, (e.g., CPICH, HS-PDSCH, etc.), and a network-supplied offset value. The offset value may be part of the SIB. Alternatively, the network may instruct the WTRU 100 to use an absolute power, but provides a rule when the WTRU 100 is allowed to provide feedback. For example, the WTRU 100 may be allowed to send the feedback if the received reference channel power is below a pre-defined value. Alternatively, the conventional HS-SCCH may be modified to include power control information related to the transmission of feedback over the shared feedback channel. Power offset or relative power command, (e.g., increase or decrease), bits may be introduced in the HS-SCCH to adjust the transmission power of the WTRU over the shared feedback channel. Optionally, the WTRU 100 may include channel quality information in the feedback.

A scheme for sending a CQI via the P-RAFCH is disclosed hereinafter. A CQI is also transmitted via the P-RAFCH. While the CQI feedback may be either scheduled or triggered, the Node-B must be able to differentiate between NACK only feedback, CQI only feedback, and CQI feedback which is triggered by a NACK, (i.e., NACK+CQI). The P-RAFCH burst includes a data type indicator for indicating NACK only, CQI only or NACK+CQI, a data field for carrying CQI bits if needed, and a reference field for carrying a modulation phase and power reference, if needed.

These fields may be mapped into the burst by time division multiplexing (TDM), (i.e., each data is transmitted in its own time segment). Alternatively, the fields may be mapped into the burst by code division multiplexing (CDM), (e.g., a signature based structure as in the PRACH preamble). Alternatively, the fields may be mapped into the burst by frequency division multiplexing (FDM). FDM is particularly appropriate for systems, such as long term evolution (LTE), where a number of sub-carriers may be utilized. The basic physical channel resources for carrying these fields may be, but not necessarily, orthogonal at least at the WTRU.

The data field, if present, may use any multi-dimensional modulation schemes with each physical channel resource (time slot, signature, carrier, etc.) providing a dimension in the modulation vector space. Some examples of possible modulation schemes are as follows:

(1) Multi-dimensional m-phase shift keying (PSK) (including binary phase shift keying (BPSK) (m=2), quadrature phase shift keying (QPSK) (m=4)), m is an integer power of 2. The number of physical channel resources required is $M/\log_2 m$, and additional phase and power reference is required.

(2) Multi-dimensional m-quadrature amplitude modulation (QAM) (including BPSK (m=2) and QPSK (m=4)), m is an integer power of 2. The number of physical channel resources required is $M/\log_2^m$, and additional phase and power reference is required.

(3) m-ary orthogonal modulation. The number of physical channel resources required is M (i.e., m=M), and additional phase and power reference is not needed.

(4) m-ary bi-orthogonal modulation. The number of physical channel resources required is M/2 (i.e., m=M/2), and additional phase and power reference is required.

(5) Multi-dimensional on-off keying, (i.e., M/2 carriers are either with or without power). The number of physical channel resources required is M/2, (i.e., m=M/2), and additional phase and power reference is not required.

The modulation scheme to be used should be signaled to the WTRU. Certain modulation schemes may require the use of a phase and power reference, while others do not. The reference, if required, may be sent together with the data type indicator. The data type indicator and the reference field may be sent on separate physical resources. Alternatively, only the data type indicator is sent and the reference field is derived from it using decisions feedback, (i.e., the data type indicator is assumed to be demodulated correctly, which permits its re-use as a reference signal).

Additionally, in order to avoid the explicit transmission of the data type indicator, a CQI may always be triggered by the need to transmit a NACK, (i.e., a NACK and a CQI are always sent together). Alternatively, if a NACK is sent and a CQI does not need to be sent, the data field corresponding to the highest CQI value may be used. These types of transmissions are referred to as an implicit data type format. The use of this format should be signaled to the WTRU.

The Node-B detects the presence of power over the complete burst. If power is detected in a burst space, and a data type indicator is used, the Node-B reads the data type indicator. If a CQI is present, the CQI is demodulated according to the modulation scheme used. If the implicit data type format is used, the presence of power indicates a NACK and a CQI transmission.

Because of the multicast nature of the transmissions and the need to serve most or all WTRUs, the Node-B may collect CQIs over some time period. The Node-B selects the minimum CQI over this time period and schedules data rates according to the minimum CQI. In this manner all WTRUs may be highly likely to be served.

This scheme does, however, have a disadvantage that a WTRU with a bad channel condition may significantly reduce the throughput of the whole system. The Node-B has no way to identify that such a WTRU exists in a direct way because all feedback from the WTRUs is anonymous. In order to solve this problem, the Node-B may collect statistics about CQI transmissions and may ignore any CQIs that are statistically very far from the majority. The Node-B may then select a minimum CQI from the remaining CQIs and uses that as a baseline.

Alternatively, the Node-B may select a certain small subset, (e.g., lower 20% or lower 10%), of CQIs after the removal of outliers. The Node-B may then use an average of these, (e.g. the actual average, a median, etc.). Because of the multicast nature, the highest CQIs are unlikely to have any impact on the system operation. Thus, the WTRU may not send the highest possible CQI value.

Another embodiment of layer 2/3 (L2/3) based operation is disclosed hereinafter. A WTRU 100 listens to network signaling which tells the WTRU 100 when, how often, and to whom to report feedback to the downlink shared service. The WTRU 100 decodes signals on an allocated TTI for a shared downlink service. The WTRU 100 then collects statistics of decoding success or failure rate and compares to the decoding statistics to a pre-defined threshold that is provided by the network. The WTRU 100 sends feedback if the decoding statistics is worse than the pre-defined threshold.

If the WTRU 100 has selected a Node-B out of several synchronized Node-Bs which transmit the same data, the WTRU 100 transmits the feedback to that selected Node-B only. If the WTRU 100 performs soft combining of signals from a plurality of Node-Bs in an active set, the WTRU 100 sends the feedback to the strongest Node-B in the active set.

The network may indicate desired transmission of the NACK on a cell different from the one where the downlink shared service, (e.g., MBMS), is received. The cell is indicated by the network.

The downlink shared service may be mapped to a code that will be transmitted with the NACK. Alternatively WTRU connection ID may be signaled. Alternatively, if using a PRACH for the feedback, the physical channel access opportunities may be mapped to the downlink shared service. The mapping may be indicated by the network. If needed, CQI information may be transmitted together with the NACK or in its place. Since the signaling is at L2/3, a larger number of bits are supported in a straightforward fashion.

Some downlink shared services, (e.g., video), may use a layered QoS mechanism where certain users get higher throughput and quality than others. In a wireless system, an important factor that determines the QoS of a user is the throughput achievable given the location of the user in the system. The maximum throughput achievable at cell edge is typically less than the one achievable around the cell center. The layered QoS may be supported without feedback from dedicated physical channels.

One conventional layered QoS mechanism, (e.g., digital video broadcasting (DVB)), is based on hierarchical modulation. In hierarchical modulation, multiple data streams, (typically a high-priority and a low-priority), are modulated into a single signal that is received by all users. Users with good signal quality may decode both data streams while users with low signal quality may decode only the high-priority stream. For instance, the streams may be encoded as a 16 quadrature amplitude modulation (16QAM) signal. The quadrant where the signal is located represents two high priority bits whereas the position of the signal within the quadrant represents two low priority bits. Users with good signal quality are able to decode the signal as 16QAM while users with low signal quality can only decode the signal as quadrature phase shift keying (QPSK) and extract only the high priority bits.

In accordance with the embodiments, some new signaling is provided. From the network point of view, it would be unsatisfactory that all WTRUs report their ACK or NACK feedback based on decoding of the high priority stream only because it would lack information about the performance of favorably located WTRUs. On the other hand, having all WTRUs providing feedback based on decoding of all streams is also unsatisfactory because non-favorably located WTRUs would overload the P-RAFCH with NACK.

The network sets at least one CQI threshold to determine on which stream each WTRU should provide feedback. The CQI threshold(s) is signaled from the network, (e.g., on the BCCH, dedicated control channel (DCCH), or MBMS control channel (MCCH) for broadcast, multicast, or unicast).

A WTRU 100 measures its own CQI (or average CQI). The WTRU 100 compares the measured CQI to the CQI threshold(s) and determines the smallest CQI threshold higher than the measured CQI. This CQI threshold corresponds to a certain subset of stream(s) that the WTRU 100 needs to report feedback. The WTRU 100 reports ACK or NACK feedback on the decoding of the subset of stream(s) determined based on the CQI comparison. It is possible to further restrict the subset of streams to report feedback based on WTRU subscription to the high quality service.

A particular CQI threshold may be set below which the WTRU 100 is not allowed to provide feedback. For example, in the case that there are only two streams, (high priority stream and low priority stream), and two CQI thresholds, (high CQI threshold and low CQI threshold), are set, if the measured CQI is above the high CQI threshold, the WTRU 100 may report feedback on both high priority and low priority streams. If the measured CQI is below the high CQI threshold but above the low CQI threshold, the WTRU 100 may report feedback on the high priority stream only. If the measured CQI is below the low CQI threshold, the WTRU 100 may not provide feedback at all.

The Node-B 120 may change the CQI threshold(s) from time to time based on load conditions. For instance, in case the load of the Node-B 120 due to other services is low, the Node-B 120 may allocate more resources to the downlink shared services and employ less aggressive MCS to encode the streams, which allows more WTRUs to enjoy high QoS. In case of high contention between the downlink shared services and other services, the Node-B 120 may use more aggressive MCS to transmit the streams thereby reducing the amount of resources for the downlink shared services.

Alternatively, the multiple streams may be transmitted separately in different time or using different codes. For instance, a high priority stream may be transmitted with a less aggressive MCS while a low priority stream may be transmitted with a more aggressive MCS. This allows more flexibility in the selection of the MCS and CQI thresholds for decoding the streams. The disadvantage is that it is less efficient since the streams are not combined in the same signal.

It should be noted that although the feedback mechanism above is described in terms of CDMA systems, it is generic and may be applied to any wireless communication systems, and the physical channel, P-RAFCH, may be defined by a combination of any physical resources.

A method of counting the number of WTRUs which are listening to a particular Node-B transmission by using a contentions feedback channel, (such as P-RAFCH), will be explained hereafter. Suppose that there are a number (M) of WTRUs satisfying a configured criterion. The number of these WTRUs is counted by forcing each one of these WTRUs to send a signal, (e.g., ACK, NACK, PING, or the like), on the P-RAFCH.

In accordance with one embodiment, a particular physical resource, (such as subcarrier, code, timeslot, spatial stream, or combination of these), may be allocated for each WTRU and the number of physical resource that are actually used may be counted. This will generate a very accurate outcome ignoring communication error. However, it may be inefficient in terms of overhead because if there are a lot of WTRUs that may be present, a lot of physical resources are needed.

Alternatively, N physical resources may be reserved for the P-RAFCH that the WTRUs may access at random. The number of physical resources actually used is then counted, and the number of WTRUs (M) is estimated based on the number of used physical resources. While this estimate may not be precise, the error may be tolerable for many applications. The counting error depends on the number of available physical resources (N) and the number of WTRUs (M). The number of N physical resources that is needed for acceptable error may be obtained by solving following equation (4) for N:

$$M_{max} = \frac{c}{p} N \ln(N) \qquad \text{Equation (4)}$$

where $M_{max}$ is the number of WTRUs that may be present, c>1 is a tolerance factor, (e.g., c=2), and p is the probability with which a WTRU transmits on the P-RAFCH if the conditions for transmission are met, which will be described in detail below. For large $M_{max}$, N may be significantly lower than $M_{max}$ resulting in substantial reduction in signaling overhead in the uplink. Any other number of physical resources may be used depending on the acceptable error.

A P-RAFCH is a physical channel that is defined by allocating one or more physical resources, (e.g., sub-carriers, codes, time-slots, spatial streams, or combination of all or some of these). N physical resources are reserved for the P-RAFCH for every predefined time interval. This predefined time interval is referred to as a P-RAFCH frame. The P-RAFCH frame may correspond to a frame, super-frame, sub-frame, slot, etc. in different wireless communication standards. More than one P-RAFCH may be defined in a cell.

A "transmission criterion" (TC) is defined for each P-RAFCH. A TC for a P-RAFCH may be at least one of the following, but not limited to:
   (1) Successful reception of a data packet or a block of data on a particular downlink physical channel;
   (2) Successful reception of a block of data on a particular data service (which may be spread across multiple channels);
   (3) Reception of a particular signaling command;
   (4) Occurrence of a measurement event; or
   (5) Failure to receive a particular transmission after a specified number of times.

A TC needs to yield a YES/NO answer, and each WTRU must be able to determine it independently without any external coordination.

Figure 6:
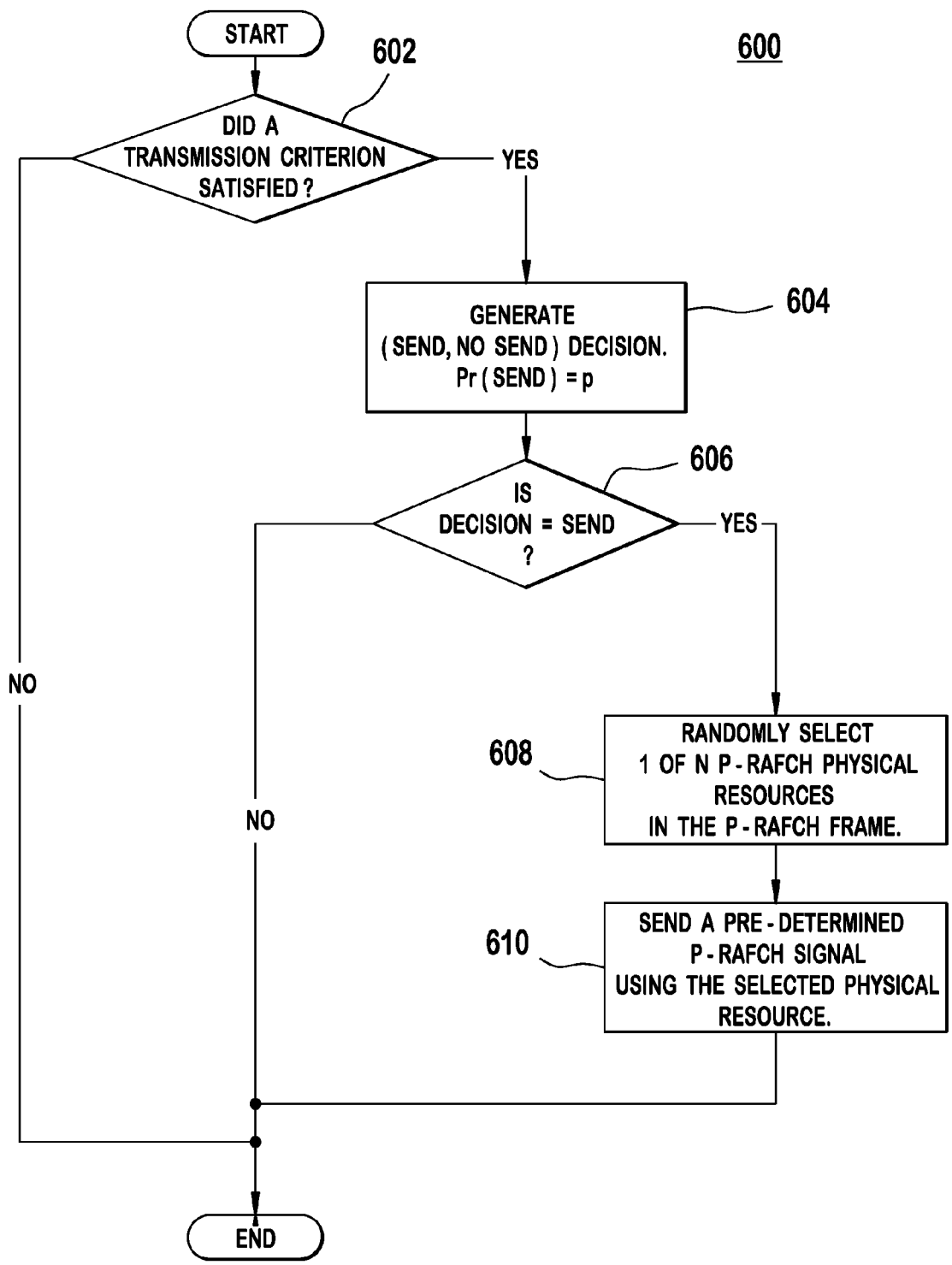
FIG. 6 is a flow diagram of an example process of evaluating a transmission criterion for transmitting a P-RAFCH.

FIG. 6 is a flow diagram of an example process 600 of evaluating a transmission criterion for transmitting a P-RAFCH. In each P-RAFCH frame for each P-RAFCH, a WTRU determines whether a TC associated with the P-RAFCH is satisfied (step 602). The TC associated with each P-RAFCH is provided as a part of P-RAFCH setup. If the TC has not been satisfied, the process 600 ends, (i.e., the WTRU does not transmit a P-RAFCH in this P-RAFCH frame). If the TC has been satisfied, the WTRU may optionally make a decision whether to send a P-RAFCH or not based on a preconfigured probability (p) of sending a P-RAFCH (step 604). The probability (p) may be set to '1' so that the WTRU may always send the signal once the TC is satisfied. If the WTRU decides not to send a P-RAFCH at step 606, the process 600 ends, (i.e., the WTRU does not transmit a P-RAFCH in this P-RAFCH frame). If the WTRU decides to send a P-RAFCH at step 606, the WTRU randomly selects one of N available P-RAFCH physical resources associated with the P-RAFCH (step 608). The WTRU then transmits a pre-defined signal using the selected physical resource (step 610). All WTRUs may transmit the same signal and the signal may be designed in such a way that collisions are unlikely to result in nulling of the signal, (e.g., a constant amplitude and phase).

In each P-RAFCH frame and for each P-RAFCH the Node-B estimates whether each physical resource was used, (e.g., using a signal detection scheme). The Node-B counts the number of used physical resources and estimates the number of WTRUs (M) accessed the P-RAFCH based on the number of used physical resources.

Many services and operational improvements are possible by using the number of WTRUs (counted or estimated). In some applications, a broadcast service transmits certain contents to users. The broadcaster may need to know how many users are listening to the channel, for example in order to enable the broadcaster to estimate how much to charge advertisers whose contents are broadcast on the same channel. In this case, it is not important to know who those listeners are, but only how many of them. To this effect the listeners are instructed to send a signal (PING).

In some applications of broadcast services, the network may wish to make sure that a service is available to at least a certain number or percentage of WTRUs in the cell. To ensure this, it needs to estimate the total number of WTRUs attempting to receive the service and how many of these are receiving it successfully. To do so, any two of the following three quantities are needed: the number of successful receptions (ACKs), the number of failures (NACKs), and the number of WTRUs present (PINGs). This may be accomplished by defining two P-RAFCHs for the service, (for example, one for ACKs and one for NACKs, or alternatively one for PINGs and one for ACKs or NACKs). Using a total count (PINGs) may be preferable as this quantity is likely to remain stable for a prolonged period of time and such a count may be requested periodically using a more general P-RAFCH for feedback.

In both broadcast and unicast unacknowledged services, (i.e., the services without dedicated feedback), the Node-B may wish to utilize several retransmissions to ensure proper data delivery. On the other hand, the Node-B may want to fine-tune the number of retransmissions to minimize the number of retransmissions while delivering appropriate quality of service (QoS) to at least some minimal number of WTRUs. The P-RAFCH may be used for this object by defining TC to be lack of successful decoding after a predetermined number of retransmissions. A WTRU attempts to decode data after every re-transmission, and if the WTRU fails after a pre-defined number of attempts, the WTRU sends a NACK on the P-RAFCH. By counting the NACKs and estimating the number of WTRUs which responded, the Node-B may appropriately select the number of retransmissions which minimizes air interface usage while meeting the required QoS. This mechanism may be used for adjusting power control for these types of services.

The method for estimating the number of WTRUs (M) based on the number of observed used physical resources out of a total of N physical resources in a P-RAFCH frame is explained in detail. It should be noted that this is not the only estimator that may be used, although the estimator M provides fairly good performance especially when M is likely to be quite large.

It is assumed that p=1, (i.e., a WTRU always transmits on a P-RAFCH if a TC is satisfied). It should be noted that setting p=1 is an example and p may be set differently. When p is not equal to '1', equation (8) below needs to be multiplied by a factor of 1/p. Because the generation of SEND/NO SEND decision for each WTRU is independent of other events, the analysis extends to other value of p: 0<p<1, by simply multiplying the estimator by a factor of 1/p.

Let T be the number of used physical resources in a P-RAFCH frame with a total of N physical resources. T is a random variable, $0 \leq T \leq N$. Based on this, the number of WTRUs that actually sent feedback is estimated, (i.e., count the WTRUs which sent an ACK).

The distribution of T given M is a distribution that when M agents picked one out of $N \geq 1$ objects (with replacement). Only T distinct objects are actually picked. The problem is closely related to the coupon collector problem, which is a standard combinatorial problem. The distribution is given as follows:

$$Pr\{T=t\} = \frac{N!}{(N-t)!} \frac{S(M,t)}{N^M}, \quad 0 \leq t \leq \min(N, M), \quad \text{Equation (5)}$$

$$Pr\{T=t\} = 0 \quad \text{otherwise,}$$

where S(M,T) is the Stirling number of the second kind:

$$S(M,t) = \frac{1}{t!} \sum_{j=0}^{t} (-1)^j \binom{t}{j} (t-j)^M. \quad \text{Equation (6)}$$

The distribution is quite complex. In particular, the maximum likelihood (ML) estimate is difficult to obtain as maximizing Equation (4) over M is difficult analytically or computationally. It is well known that asymptotically:

$$E[T] = N\left(1 - \left(1 - \frac{1}{N}\right)^M\right) \approx N(1 - e^{-M/N}). \quad \text{Equation (7)}$$

While equation (7) is accurate only asymptotically, it is good enough. From equation (7), the following approximate estimator may be used:

$$\hat{M}(t) = \frac{\ln\left(1 - \frac{t}{N}\right)}{\ln\left(1 - \frac{1}{N}\right)} \approx -N\ln\left(1 - \frac{t}{N}\right). \quad \text{Equation (8)}$$

The approximate estimator may be used instead of the exact one to save some complexity, if needed. It can be shown that equation (8) is the minimum variance unbiased estimator of M based on T.

If t=N, the estimate $\hat{M}(N)=\infty$. This makes intuitive sense in the view of an ML estimation, i.e., maximizing a posteriori likelihood. In case that all physical resources in the P-RAFCH frame have been used, the number of WTRUs that makes it most likely that this would happen should be infinite, absent any upper bound. Using this intuition, a design criterion is suggested for selecting an appropriate number of feedback slots, given a maximum expected number of WTRUs. Specifically, $$M_{max}(N) = -cN\ln\left(1 - \frac{N-1}{N}\right) = cN\ln(N), \quad \text{Equation (9)}$$

which can be solved for N numerically given $M_{max}$. C is an appropriately selected constant, which may even be set larger than 1. For example, c=2 would be a reasonable choice.

Although the features and elements are described in the preferred embodiments in particular combinations, each feature or element can be used alone without the other features and elements of the preferred embodiments or in various combinations with or without other features and elements. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method implemented in a wireless transmit/receive unit (WTRU) for sending feedback on a contentious feedback channel for a downlink shared service provided to a plurality of WTRUs, the method comprising:
   receiving a downlink transmission carrying the downlink shared service for a plurality of WTRUs via a downlink shared channel; and
   sending a pre-configured signal indicating a negative acknowledgement (NACK) via a feedback channel associated with the downlink shared service on a condition that the downlink transmission carrying the downlink shared service is not successfully decoded, wherein the feedback channel is a contentious channel shared by a plurality of WTRUs and no acknowledgement to the pre-configured signal is required.

2. The method of claim 1 further comprising:
   determining whether to send the pre-configured signal based on a pre-configured probability function based on a random number.

3. The method of claim 1 further comprising:
   selecting a physical resource randomly among a plurality of physical resources assigned for the feedback channel that is associated with the downlink shared service, wherein the pre-configured signal is transmitted using the selected physical resource.

4. The method of claim 1 wherein a transmit power for sending the pre-configured signal is determined either based on an open-loop power control, or indicated by a network.

5. A method for estimating a number of wireless transmit/receive units (WTRUs) satisfying a transmission criterion, the method comprising:
   receiving a pre-configured signal on a physical random access feedback channel (P-RAFCH) from a plurality of WTRUs, the P-RAFCH being a contentious channel used for sending feedback when a transmission criterion associated with the P-RAFCH is satisfied; and
   calculating a number of the WTRUs based on a number of physical resources used among a plurality of physical resources reserved for the P-RAFCH.

6. The method of claim 5 wherein the number of WTRUs is calculated considering a probability that a WTRU transmits the preconfigured signal on a condition that the transmission criterion is satisfied.

7. The method of claim 5 wherein a particular physical resource is assigned to each of the WTRUs and the number of WTRUs is calculated by counting the number of physical resources used.

8. The method of claim 5 wherein a per-determined number of physical resources is assigned for the P-RAFCH, and the number of WTRUs is estimated based on the number of used physical resources.

9. The method of claim 8 wherein the number of WTRUs is estimated by $$-N\ln\left(1-\frac{t}{N}\right),$$

N being a number of physical resources assigned for the P-RAFCH, and t being a number of actually used physical resources.

10. The method of claim 5 wherein the transmission criterion is at least one of successful reception of a data packet on a downlink physical channel, successful reception of a data block on a data service, reception of a signaling command, occurrence of a measurement event, or failure to receive a transmission after a specified number of times.

11. A wireless transmit/receive unit (WTRU) configured to send feedback on a contentious feedback channel for a downlink shared service, the WTRU comprising:
   a transceiver configured to receive a downlink transmission carrying the downlink shared services for a plurality of WTRUs via a downlink shared channel; and
   a controller configured to send a pre-configured signal indicating a negative acknowledgement (NACK) via a feedback channel associated with the downlink shared service on a condition that the downlink transmission carrying the downlink shared service is not successfully decoded, wherein the feedback channel is a contentions channel shared by a plurality of WTRUs and no acknowledgement to the pre-configured signal is required.

12. The WTRU of claim 11 wherein the controller is configured to determine whether to send the pre-configured signal based on a pre-configured probability function based on a random number.

13. The WTRU of claim 11 wherein the controller is configured to select a physical resource randomly among a plurality of physical resources assigned for the feedback channel that is associated with the downlink shared service and transmit the pre-configured signal using the selected physical resource.

14. The WTRU of claim 11 wherein the controller is configured to determine a transmit power for sending the pre-configured signal either based on an open-loop power control, or as indicated by a network.

15. A Node-B configured to estimate a number of wireless transmit/receive units (WTRUs) satisfying a transmission criterion, the Node-B comprising:
   a receiver configured to receive a pre-configured signal on a physical random access feedback channel (P-RAFCH) from a plurality of WTRUs, the P-RAFCH being a contentious channel used for sending feedback when a transmission criterion associated with the P-RAFCH is satisfied; and
   a controller configured to calculate a number of the WTRUs based on a number of physical resources used among a plurality of physical resources reserved for the P-RAFCH.

16. The Node-B of claim 15 wherein the controller is configured to calculate the number of WTRUs considering a probability that a WTRU transmits the preconfigured signal on a condition that the transmission criterion is satisfied.

17. The Node-B of claim 15 wherein a particular physical resource is assigned to each of the WTRUs and the controller is configured to calculate the number of WTRUs by counting the number of physical resources used.

18. The Node-B of claim 15 wherein a per-determined number of physical resources is assigned for the P-RAFCH, and the controller is configured to estimate the number of WTRUs based on the number of used physical resources.

19. The Node-B of claim 18 wherein the controller is configured to estimate the number of WTRUs by $$-N \ln\left(1 - \frac{t}{N}\right),$$

N being a number of physical resources assigned for the P-RAFCH, and t being a number of actually used physical resources.

20. The Node-B of claim 15 wherein the transmission criterion is at least one of successful reception of a data packet on a downlink physical channel, successful reception of a data block on a data service, reception of a signaling command, occurrence of a measurement event, or failure to receive a transmission after a specified number of times.

* * * * *

UNITED STATES PATENT AND TRADEMARK OFFICE
CERTIFICATE OF CORRECTION

PATENT NO. : 8,068,511 B2
APPLICATION NO. : 12/549726
DATED : November 29, 2011
INVENTOR(S) : Reznik et al.

It is certified that error appears in the above-identified patent and that said Letters Patent is hereby corrected as shown below:

ON THE TITLE PAGE

Item (75), inventor: line 4 after "Paul", delete "Mariner" and insert --Marinier--.

Claim 8, column 15, line 64, after "5 wherein", delete "per-determined" and insert --pre-determined--.

Signed and Sealed this
Seventeenth Day of July, 2012

David J. Kappos
*Director of the United States Patent and Trademark Office*